(12) United States Patent
Bitner

(10) Patent No.: US 10,782,650 B1
(45) Date of Patent: Sep. 22, 2020

(54) GAUGE FOR MONITORING INSTANCES OF A STORAGE SYSTEM EVENT

(71) Applicant: Infinidat Ltd., Herzliya (IL)

(72) Inventor: Haim Bitner, Raanana (IL)

(73) Assignee: Infinidat Ltd., Herzliya (IL)

( * ) Notice: Subject to any disclaimer, the term of this patent is extended or adjusted under 35 U.S.C. 154(b) by 374 days.

(21) Appl. No.: 15/717,943

(22) Filed: Sep. 28, 2017

(51) Int. Cl.
*G04F 10/00* (2006.01)
*G06F 17/18* (2006.01)

(52) U.S. Cl.
CPC .............. *G04F 10/00* (2013.01); *G06F 17/18* (2013.01)

(58) Field of Classification Search
CPC .................................. G04F 10/00; G06F 17/18
See application file for complete search history.

(56) References Cited

U.S. PATENT DOCUMENTS 10,067,260 B2 * 9/2018 McKenney ............ G06T 11/008
2019/0025786 A1 * 1/2019 Park .................... G05B 23/0264

OTHER PUBLICATIONS

Datar et al., 'Maintaining Stream Statistic Over Sliding Windows', 2002, SIAM, vol. 31, No. 6, pp. 1794-1813 (Year: 2002).*

* cited by examiner

*Primary Examiner* — Elias Desta
(74) *Attorney, Agent, or Firm* — Reches Patent

(57) ABSTRACT

A method for monitoring a storage system event, the method may include receiving, by a control unit of a storage system, a request to access a gauge that is associated with the storage system event; updating, by the control unit, a value of the gauge based on (a) a time difference between a time related to the request to access the gauge and a time related to a previous request to access the gauge, and (b) a length of a sliding time window; wherein when the request to access the gauge is triggered by an occurrence of an instance of the storage system event then the updating is further responsive to the occurrence of the instance of the storage system event; and wherein the value of the gauge provides an approximation of an average rate of instances of the storage system event during the sliding time window.

16 Claims, 8 Drawing Sheets

W=10

| t (sec) | Delta-t | Events reported | Rate-Gauge |
|---|---|---|---|
| 0 | 0 | 0 | 0 |
| 1 | 1 | 2 | 0.2 |
| 2 | 1 | 2 | 0.4 |
| 3 | 1 | 2 | 0.5 |
| 4 | 1 | 2 | 0.7 |
| 5 | 1 | 2 | 0.8 |
| 6 | 1 | 2 | 0.9 |
| 7 | 1 | 2 | 1.1 |
| 8 | 1 | 2 | 1.2 |
| 9 | 1 | 2 | 1.2 |
| 10 | 1 | 2 | 1.3 |
| 11 | 1 | 2 | 1.4 |
| 12 | 1 | 2 | 1.5 |
| 13 | 1 | 2 | 1.5 |
| 14 | 1 | 2 | 1.6 |
| 15 | 1 | 2 | 1.6 |
| 16 | 1 | 2 | 1.7 |
| 17 | 1 | 2 | 1.7 |
| 18 | 1 | 2 | 1.8 |
| 19 | 1 | 2 | 1.8 |
| 20 | 1 | 2 | 1.8 |
| 21 | 1 | 2 | 1.8 |
| 22 | 1 | 2 | 1.9 |
| 23 | 1 | 2 | 1.9 |
| 24 | 1 | 2 | 1.9 |
| 25 | 1 | 2 | 1.9 |
| 26 | 1 | 2 | 1.9 |
| 27 | 1 | 2 | 2.0 |

11

| t (sec) | Delta-t | Events reported | Rate-Gauge |
|---|---|---|---|
| 0 | 0 | 0 | 0 |
| 2 | 2 | 2 | 0.2 |
| 4 | 2 | 2 | 0.4 |
| 6 | 2 | 2 | 0.5 |
| 8 | 2 | 2 | 0.6 |
| 10 | 2 | 2 | 0.7 |
| 12 | 2 | 2 | 0.8 |
| 14 | 2 | 2 | 0.8 |
| 16 | 2 | 2 | 0.9 |
| 18 | 2 | 2 | 0.9 |
| 20 | 2 | 2 | 1.0 |
| 22 | 2 | 2 | 1.0 |

13

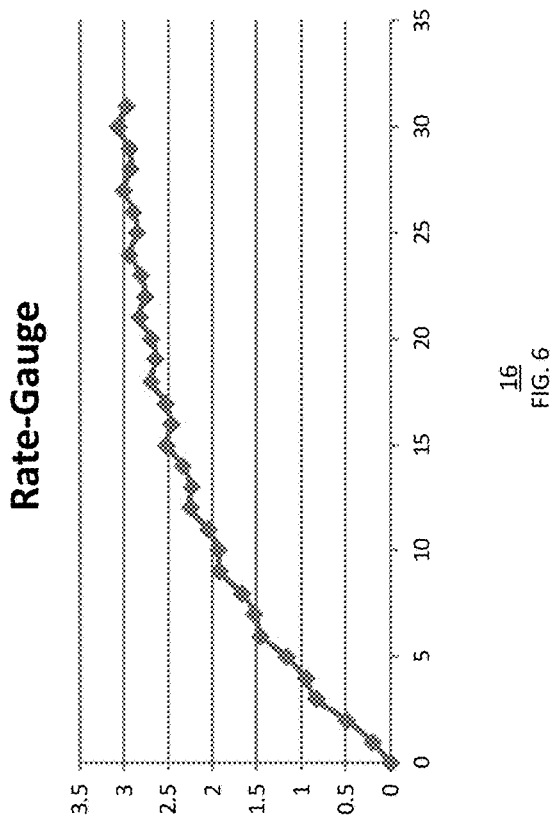

Receiving, by a control unit of a storage system, a request to access a gauge that is associated with a storage system event. 510

Updating, by the control unit, a value of the gauge based on (a) a time difference between a time related to the request to access the gauge and a time related to a previous request to access the gauge, and (b) a length of a sliding time window. When the request to access the gauge is triggered by an occurrence of an instance of a storage system event then updating the value of the gauge in response to a value of the parameter that is related to the occurrence of the instance of the storage system event. 520

Reading the value of the gauge after the updating of the value of the gauge. 530

Responding to the value of the gauge after reading the value of the gauge. 540

GAUGE FOR MONITORING INSTANCES OF A STORAGE SYSTEM EVENT

BACKGROUND

Storage systems are required to constantly monitor a rate of various event occurrences for various purposes.

A common practice for implementing a rate gauge includes defining a certain time window over which an average of event occurrences is calculated. The time window ends at the present time or near present time and starts backwards in time. Since the window has to be moving with time, the window is divided into timeslots and each timeslot is assigned with a counter that counts the number of events occurred during the timeslot. For example, suppose the time window is of 20 seconds and is divided into 20 timeslots of one second each. A total of 20 counters are handled, wherein the twentieth counter counts the events occurring during the last second t, the nineteenth counter counts the events occurred during the previous second t−1, and the first counter counts the events occurred during the first (oldest) second of the time window. New events are added to the counter of the most recent timeslot, upon occurrence. Upon timeslot lapse, e.g., at the end of the present second, the oldest counter (that holds the first timeslot of the time window) is dropped from the set of counters, and a new counter is added to the set of counters and starts counting events occurring in the new timeslot (current time). Upon timeslot lapse and/or upon request, an average is calculated over all the timeslots, e.g., the counters are summed and the total sum of all counters is divided by the number of timeslots.

The size of the window, as well as the size and number of the timeslots, depends on the frequency of the events, on the required accuracy and on the fluctuation of the events occurrences, i.e., higher expected fluctuations dictates a larger time window (and more timeslots and their counters), so as to achieve a more accurate average. The size and the number of the timeslots may depend on the required accuracy for the calculated average and the frequency of the events.

A storage system may be required to handle a vast number of gauges, which may be needed per volume, per disk drive, per accessing entity, per a pair of accessing entity and a specific volume, etc. The number of such gauges may reach thousands and even quite likely to reach millions, depending on the amount of accessing entities and/or supported volumes, etc.

The high frequency of events (e.g., 10 per second), and the consequent high frequency of gauges updating, dictates using a fast access (and usually expensive) memory for storing the counters, e.g., RAM (Random Access Memory) or fast SSD. Given that each gauge is composed of multiple counters, the total amount of memory allocated for all the gauges is a multiplication of the number of gauges, e.g., by 20 (or even more if a fluctuation of events is expected or if high accuracy is required), resulting an enormous amount of allocated memory space.

There is a need to decrease the amount of memory space allocated to gauges and to reduce the computing resources consumed by rearranging the gauge's counter sets, upon each timeslot lapse.

SUMMARY

There may be provided a method for monitoring a storage system event, the method may include receiving, by a control unit of a storage system, a request to access a gauge that may be associated with the storage system event; updating, by the control unit, a value of the gauge based on (a) a time difference between a time related to the request to access the gauge and a time related to a previous request to access the gauge, and (b) a length of a sliding time window; wherein when the request to access the gauge is triggered by an occurrence of an instance of the storage system event then the updating may be further responsive to the occurrence of the instance of the storage system event; and wherein the value of the gauge provides an approximation of an average rate of instances of the storage system event during the sliding time window.

When the request to access the gauge is a read request then the method may include reading the value of the gauge after the updating of the value of the gauge.

The pervious request to access the gauge and the request to access the gauge are consecutive requests to access the gauge.

The method may include updating the value of the gauge to reduce the approximation of the average rate using an exponential value that reflects the time difference and the length of the sliding time window.

The method may include updating the value of the gauge to reduce the approximation of the average rate using an exponential value that reflects a ratio between the time difference and the length of the sliding time window.

The updating of the value of the gauge may include multiplying the value of the gauge by an exponential value that has a base and an exponent, wherein the base equals e and the exponent equals −DeltaT/W, wherein DeltaT is the time difference and W is the length of the sliding time window.

When the accessing of the gauge is triggered by the occurrence of the instance of the storage system event then the method may include updating the value of the gauge to increase the approximation of the average rate based on the length of the sliding time window.

When the accessing of the gauge is triggered by the occurrence of the instance of the storage system event then the method may include increasing the value of the gauge by/W.

When the request to access the gauge is a read request then the method may include reacting to the value of the gauge.

The method may include reacting to the value of the gauge by enforcing a service level agreement that may be related to the storage system event.

The method may include reacting to the value of the gauge by restricting an access to a storage system entity related to the storage system event that when completed will violate a service level agreement that may be related to the storage system entity.

When the request to access the gauge is triggered by occurrences of multiple instances of the storage system event then the updating may be further responsive to the occurrences of the multiple instances of the storage system events.

The method may include monitoring storage system events of different types; wherein the method may include allocating different gauges to different types of storage system events; wherein the method may include executing, for each gauge, the steps of receiving, by the control unit of the storage system, a request to access the gauge; updating, by the control unit, a value of the gauge in response to the request to access; wherein the updating may include updating the value of the gauge based on (a) a time difference between a time related to the request to access the gauge and a time related to a previous request to access the gauge, and (b) a length of a sliding time window; wherein when the request to access the gauge is triggered by an occurrence of an instance of a storage system event of a type that may be associated with the gauge then the updating may be further responsive to the occurrence of the instance of the storage system event; wherein the value of the gauge provides an approximation of an average rate of instances of storage system event of the type that may be associated with the gauge per the sliding time window; and when the request to access the gauge is a read request then the method may include reading the value of the gauge after the updating of the value of the gauge.

The method may include performing memory management operations based on values of the different gauges.

There may be provided a method for monitoring a storage system event, the method may include receiving, by a control unit of the storage system, an indication about an occurrence of an instance of the storage entity event; and updating a value of the gauge based on (a) the occurrence of the instance of the storage entity event; (b) a difference between a time of occurrence of the instance of the storage system event and a time of a previous access to the gauge, and (c) a length of a sliding time window, wherein the value of the gauge provides an approximation of an average rate of instances of the storage entity event during the sliding time window.

The method may include receiving, by the control unit, a request to read the gauge; and amending a value of the gauge based on (a) a difference between a time of receiving the request to read the gauge and a time of a last access to the gauge that preceded the receiving of the request to read the gauge, and (b) the length of the sliding time window The method may include limiting the information about the occurrence of storage entity events to the gauge.

There may be provided a method for monitoring a parameter related to a storage system event, the method may include receiving, by a control unit of a storage system, a request to access a gauge that may be associated with the storage system event; updating, by the control unit, a value of the gauge based on (a) a time difference between a time related to the request to access the gauge and a time related to a previous request to access the gauge, and (b) a length of a sliding time window; wherein when the request to access the gauge is triggered by an occurrence of an instance of a storage system event then the updating may be further responsive to a value of the parameter that may be related to the occurrence of the instance of the storage system event; wherein the value of the gauge provides an approximation of an average value of the parameter of instances of the storage system event during the sliding time window.

The parameter may be related to an amount of data transferred during the instance of the storage system event.

When the request to access the gauge is a read request then the method may include reading the value of the gauge after the updating of the value of the gauge There may be provided a non-transitory computer program product that stores instructions that once executed by a control unit of a storage system, cause the storage controller to execute the steps of receiving a request to access a gauge that may be associated with a storage system event; updating a value of the gauge based on (a) a time difference between a time related to the request to access the gauge and a time related to a previous request to access the gauge, and (b) a length of a sliding time window; wherein when the request to access the gauge is triggered by an occurrence of an instance of the storage system event then the updating may be further responsive to the occurrence of the instance of the storage system event; and wherein the value of the gauge provides an approximation of an average rate of instances of the storage system event during the sliding time window.

There may be provided a non-transitory computer program product that stores instructions that once executed by a control unit of a storage system, cause the storage controller to execute the steps of receiving an indication about an occurrence of an instance of a storage entity event; and updating a value of the gauge based on (a) the occurrence of the instance of the storage entity event; (b) a difference between a time of occurrence of the instance of the storage system event and a time of a previous access to the gauge, and (c) a length of a sliding time window, wherein the value of the gauge provides an approximation of an average rate of instances of the storage entity event during the sliding time window.

There may be provided a non-transitory computer program product that stores instructions that once executed by a control unit of a storage system, cause the storage controller to execute the steps of receiving a request to access a gauge that may be associated with a storage system event; updating, by the control unit, a value of the gauge based on (a) a time difference between a time related to the request to access the gauge and a time related to a previous request to access the gauge, and (b) a length of a sliding time window; wherein when the request to access the gauge is triggered by an occurrence of an instance of a storage system event then the updating may be further responsive to a value of the parameter that may be related to the occurrence of the instance of the storage system event; wherein the value of the gauge provides an approximation of an average value of the parameter of instances of the storage system event during the sliding time window.

There may be provided a storage system may include a control unit that may be configured to receive a request to access a gauge that may be associated with a storage system event; update, by the control unit, a value of the gauge based on (a) a time difference between a time related to the request to access the gauge and a time related to a previous request to access the gauge, and (b) a length of a sliding time window; wherein when the request to access the gauge is triggered by an occurrence of an instance of the storage system event then the updating may be further responsive to the occurrence of the instance of the storage system event; and wherein the value of the gauge provides an approximation of an average rate of instances of the storage system event during the sliding time window.

There may be provided a storage system may include a control unit that may be configured to receive an indication about an occurrence of an instance of a storage entity event; and update a value of the gauge based on (a) the occurrence of the instance of the storage entity event; (b) a difference between a time of occurrence of the instance of the storage system event and a time of a previous access to the gauge, and (c) a length of a sliding time window, wherein the value of the gauge provides an approximation of an average rate of instances of the storage entity event during the sliding time window.

There may be provided a storage system may include a control unit that may be configured to receive a request to access a gauge that may be associated with a storage system event; update a value of the gauge based on (a) a time difference between a time related to the request to access the gauge and a time related to a previous request to access the gauge, and (b) a length of a sliding time window; wherein when the request to access the gauge is triggered by an occurrence of an instance of a storage system event then the updating may be further responsive to a value of the parameter that may be related to the occurrence of the instance of the storage system event; wherein the value of the gauge provides an approximation of an average value of the parameter of instances of the storage system event during the sliding time window.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 illustrates an example of a table;
FIG. 6 illustrates an example of a graph;
FIG. 11 illustrates an example of a method.

DETAILED DESCRIPTION OF THE DRAWINGS

Figures 1, 2:
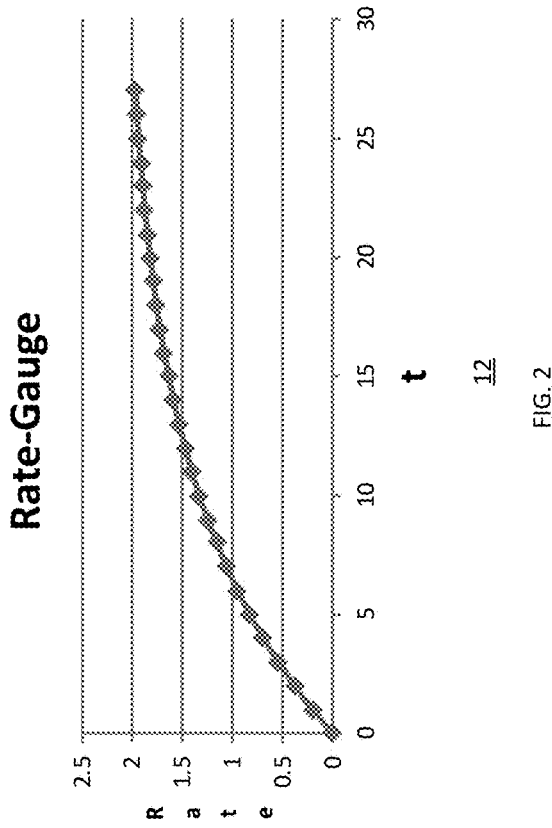
FIG. 1 illustrates an example of a table.
FIG. 2 illustrates an example of a graph.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the pool cleaning robot and the mobile computer.

The present method and system maintain a single gauge variable that holds a current average rate of events, per each event type whose rate is to be gauged.

The gauge variable is updated only upon event occurrence and upon a request to retrieve the value of the event rate being measured.

Since the gauge variable reflects the average rate of events, without needing to handle multiple counters, it eliminates the need to store and manage, per gauge, multiple counters that count the number of events and also eliminate the need to rearrange the counter-set of the gauge upon each timeslot lapse.

The levels and trends of various rates as indicated by the gauges can indicate situations of: approaching limits, potential problems and potential performance or load-balance issues. The various gauges can be used for various purposes, such as: for restricting a rate that crosses a predefined threshold, or for activating processes that cure a potential problem that may be caused by an elevated event rate, or for reconfiguring the storage system to improve performance of the storage system when trends or levels of the event rate indicates a potential degraded performance.

Examples of events rates that needs to be monitored may include: the number of received I/O requests per second, the amount of data that is being transferred (throughput) inward (e.g., write requests coming from the host) or outward (e.g., responses of the storage system to read requests). The monitoring of the average rate of I/O requests or throughput is needed so as to restrict I/Os of accessing entities (e.g., hosts, applications) that violate an assigned SLA (Service Level Agreement) that defines a limit on the number of I/Os per second or the number of transferred bytes per second. Exceeding the defined I/O per second, by the accessing entity, may cause capping operations by the storage system, such as denying or delaying the excess IO requests.

Other examples of monitored events' rates are related to monitored system performance, e.g., cache hit ratio (the ratio between the number of times data is read from the cache versus total reads, over a given time period) or cache miss ratio (the number of times data to be read is not found in the cache versus total reads, over a given time period). The cache hit and miss ratio can influent the system performance and/or the performance experienced by a specific accessing entity. Actions can be taken upon certain levels of cache miss ratio so as to change the policies of cache eviction or policies of prefetching into the cache. Actions can be taken upon certain levels of cache hit or miss ratios related to a specific accessing entity, wherein the certain levels may indicate that the SLA of the specific accessing entity is overfunded or underfunded. The actions may include increasing prioritization of caching data of an accessing entity whose SLA is underfunded, or evicting cached data of overfunded SLAs for freeing space for caching data of underfunded SLAs.

Other examples of event rate monitoring can be monitoring read/write error rate, so as to replace the storage device, or communication device or other related hardware device (e.g., fan) that causes the errors, if the error rate is above a certain level. Other error rates may also be monitored, such as network error rate.

Further examples, include monitoring an enqueuing rate or dequeuing rate of queues, so as to detect potential overload of storage devices or of bottlenecks in various processes. For example, if an enqueuing rate into a queue of write requests awaiting a certain storage device exceeds a certain threshold or is higher than a dequeuing rate, indicating that the storage device is overloaded, subsequent IO requests can be directed to other storage devices whose enqueuing rate is within allowed range, until the enqueuing rate of the storage device is alleviated.

It is assumed that there is a need to measure the average rate of events over a time window (also referred to as sliding time window) that starts W seconds prior to the present time. For example, the rate of events that is being gauged may be the average of I/Os per second during a time window of e.g., W=20 seconds.

According to the present invention, the gauge variable maintains a value that represents the average rate of event occurrences during the defined time-window. The gauge decays exponentially over time (t) in a way that simulates the formula: gauge (t)=exp(−t/W), where t—is the time and W—is the size of a time window for which the average rate is measured for. The gauge is incremented upon an occurrence of one or more events, by the number of the occurred one or more events, divided by the time-window's size, so as to reflect the contribution of the new event(s) to the rate average over the time window.

Thus, whenever there are new events to be registered in the gauge, the value of the gauge undergoes two updates: one update is for reducing the value of the gauge so as to reflect the effect of the time passed with no event occurrences and a second update is an increment that reflects the effect of the newly added events. Therefore, the gauge is first reduced so as to reflect the decay caused by the time passed without any event occurrences (until present), which should reduce the average of the event-rate. The reduction of the gauge for reflecting the time passed without any event occurrences, may be implemented with the following formula, that depends on the time passed, the size of the window and the current value (before the reduction) of the gauge:

gauge=gauge*exp(−<delta-t>/W), wherein delta-t is the difference between the current time and a previous time when the gauge was previously updated, W is the size of the time-window in time units of e.g., seconds. In addition to the reduction, there is a need to add the impact of the new events on the average of the event-rate, by adding to the gauge the contribution of the new events to the average of events across the last time-window:

gauge=gauge+n/W, wherein n is the number of newly added events and n/W is the contribution of the new events to the average of event rate over the time window.

The gauge may be also updated upon a request to read the value of the gauge, by reducing the gauge, prior to reading, according to the same reduction formula:
gauge=gauge*exp(−<delta-t>/W).

The following description is for demonstrating that using the above formulas to update the gauge value, causes the gauge value to reflect a rate of event occurrences, or in other words—the gauge value reflects a derivation of events curve in time:

As described above, the gauge is decreased in time according to:

(i) gauge(t)=exp(−t/W), and the derivation of the equation is:

d/dt(gauge(t))=−1/W*(d/dt(exp(−t/W)), as −1/W is the derivation of −t/W, and the derivation of an exponential function is the exponential function itself, i.e., d/dt(exp(−t/W))=exp(−t/W), and the value of exp(−t/W) is known from equation (i) to be equal to gauge (t). Therefore:

(ii) d/dt(gauge)=−gauge(t)/W

The gauge is increased according to the formula:

(iii) gauge(t)=N(t)/W, where N(t) is the total accumulated events n, as function of time. The derivation of the equation is:

(iv) d/dt(gauge(t))=(dN/dt)/W

The equilibrium is reached when the increment rate (iv) is equal to the decay rate (ii): (v) (dN/dt)/W=gauge(t)/W, and therefore, balance means:

(vi) gauge=dN/dt, where dN/dt represents the average rate of events, meaning the single gauge variable is approaching exponentially, with time, to the average rate of events.

FIGS. 1-7 illustrate how the value of the gauge approaches, exponentially the real rate of events. All figures illustrate updating the gauge upon event reporting, according to: gauge=gauge*exp(−<delta-t>/W)+n/W, where W is set to 10 seconds and n is the number of reported events.

FIG. 1 illustrates a table 11 and FIG. 2 illustrates a graph 12 that represents the values of a gauge when there is a steady rate of events—where every second two events are reported, meaning a rate of two events per second. At time t=0, the value of the gauge is set to zero, and then updated every second, with delta-t equals one. It can be seen from the graph and the table that the value of the gauge raises exponentially until reaching the expected value of two, within about 27 seconds.

Figures 3, 4:
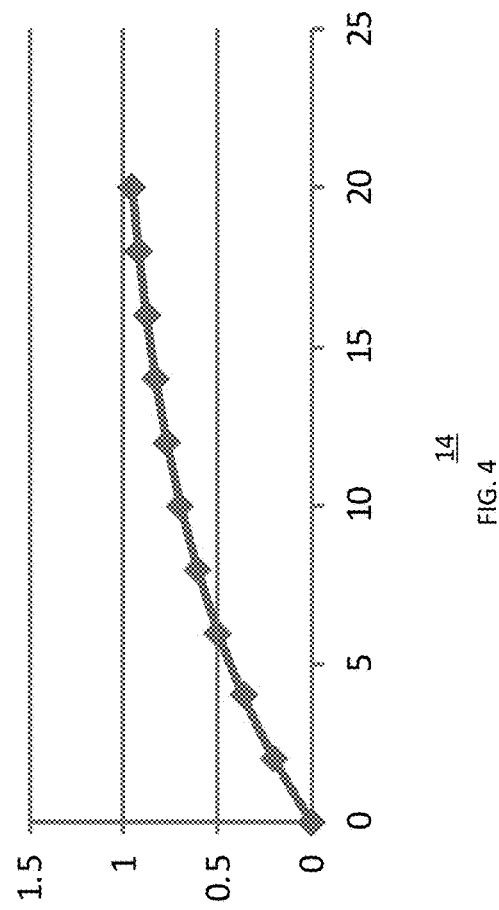
FIG. 3 illustrates an example of a table.
FIG. 4 illustrates an example of a graph.

FIG. 3 illustrates a table 13 and FIG. 4 illustrates a graph 14 that represents the values of a gauge when there is a steady rate of events—where there are two events every two second, meaning an average rate of one event per second. It can be seen from the graph and the table that the value of the gauge raises exponentially until reaching the expected value of one, within about 20 seconds.

FIG. 5 illustrates a table 15 and FIG. 6 illustrates a graph 16 that represents the values of a gauge when there are slight fluctuations in the reported events, where two, three and four events are reported every following second respectively, meaning an average rate of three events per second ((2+3+4)/3). It can be seen from the graph and the table that the value of the gauge raises exponentially until reaching the expected value of three, within about 27 seconds.

Figure 7:
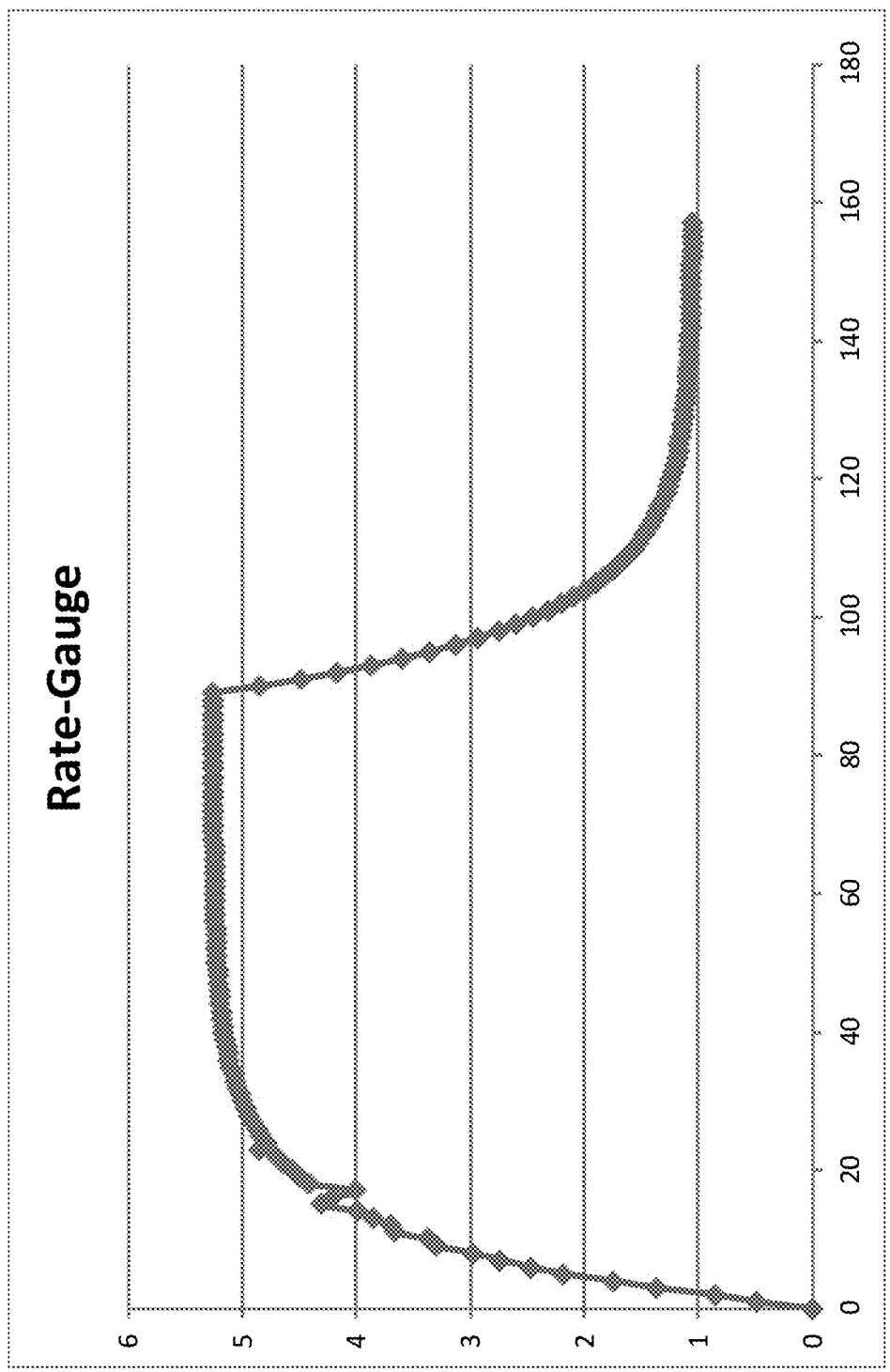
FIG. 7 illustrates an example of a graph.

FIG. 7 illustrates graph 17 when a rate of around five events per second is followed by a rate that falls to one event per second. Both rising and decaying have an exponential nature.

Figure 8:
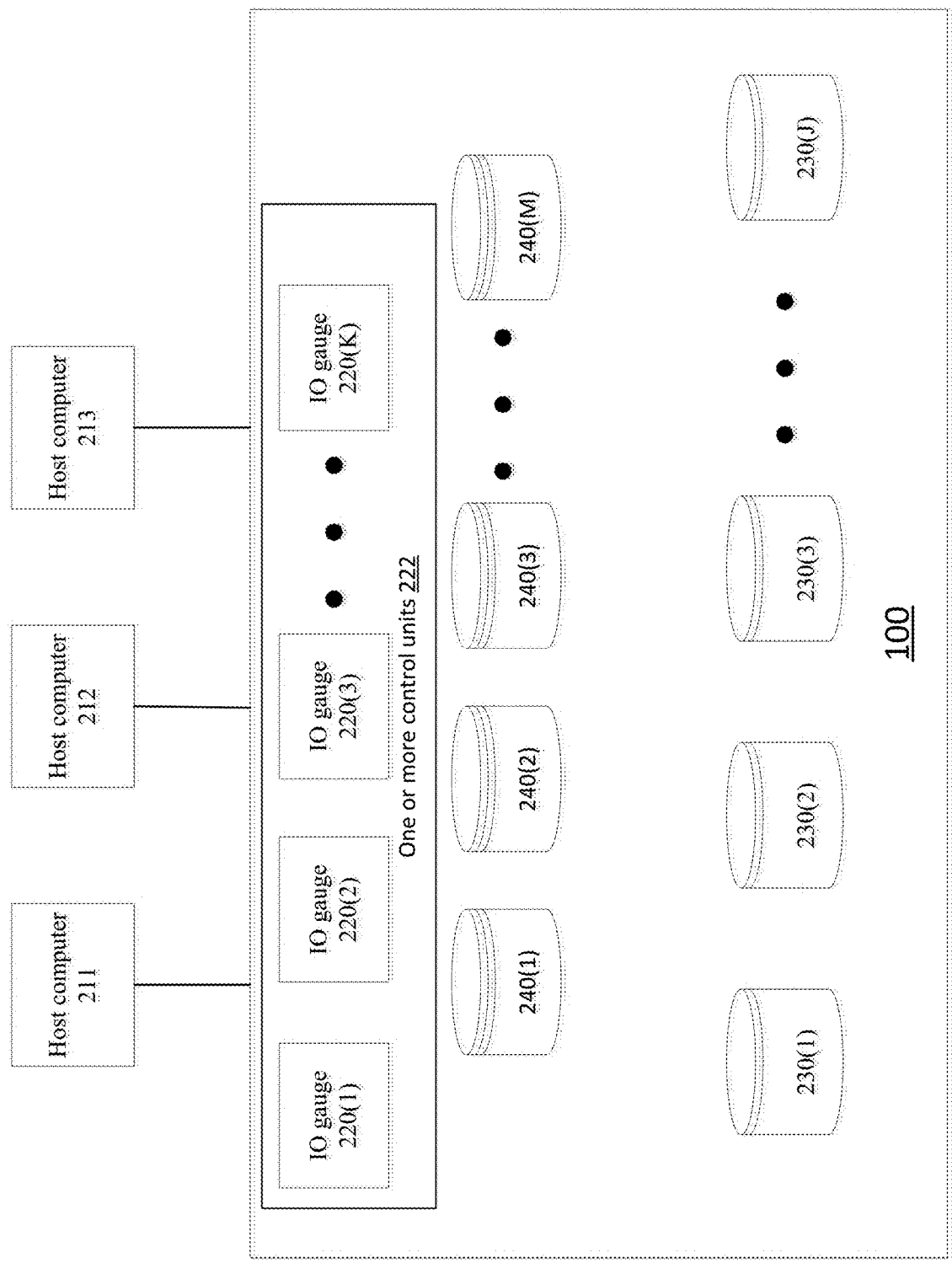
FIG. 8 illustrates an example of a storage system, a network and host computers.

FIG. 8 illustrates a storage system 100 that provides storage services to host computers 211, 212 and 213 coupled to storage system 100. Each host computer may host multiple applications that access the storage system. The storage space of storage system 100 is provided by multiple storage devices 230(1)-230(J). The storage space of storage system 100 is presented to the host computers as logical volumes 240(1)-240(M).

Storage system 100 monitors the I/O requests from the multiple accessing entities, such as host computers 211-213, or the various applications running on the host computers and calculates I/O rates, by using I/O gauges 220(1)-220(K). Storage system 100 may manage a single I/O gauge per each accessing entity, e.g., per host or per application, and/or per each storage entity, e.g., a volume, a storage device, and/or per a pair combination of accessing entity and a storage entity, for example per each pair of host and volume, e.g., I/O gauge 220(1) may capture the I/O rate of host computer 211 towards volume 240(1), I/O gauge 220(2) may capture the I/O rate of host computer 212 towards volume 240(2), I/O gauge 220(3) may capture the I/O rate of host computer 212 towards volume 240(3), I/O gauge 220(K) may capture the I/O rate of host computer 213 towards volume 240(M), etc.

Storage system events may be related to different operations, different accessing entities, different storage entities, different combinations of an accessing entity and a storage system entity, different IO operations, and the like.

Storage system 100 may be a vast storage system for storing 1 petabytes or more. A non-limiting example of a storage system may be Infinibox™ of Infinidat Ltd.

The number of gauges maintained by storage system may exceed 1000, 10000, 100000, 1000000 and the like.

FIG. 8 illustrates one or more control units 222. A control unit may be one or more hardware controllers and/or may be include one or more hardware components. A computerized system such as a server, a computer—or part of the computerized system may be configured to perform any of the functions of the control unit by being programmed to do so. In FIG. 8 the one or more control units 222 include IO gauges 220(1)-220(K). This is not necessarily so. The IO gauges may be otherwise accessible to the one or more control units 222.

Figure 9:
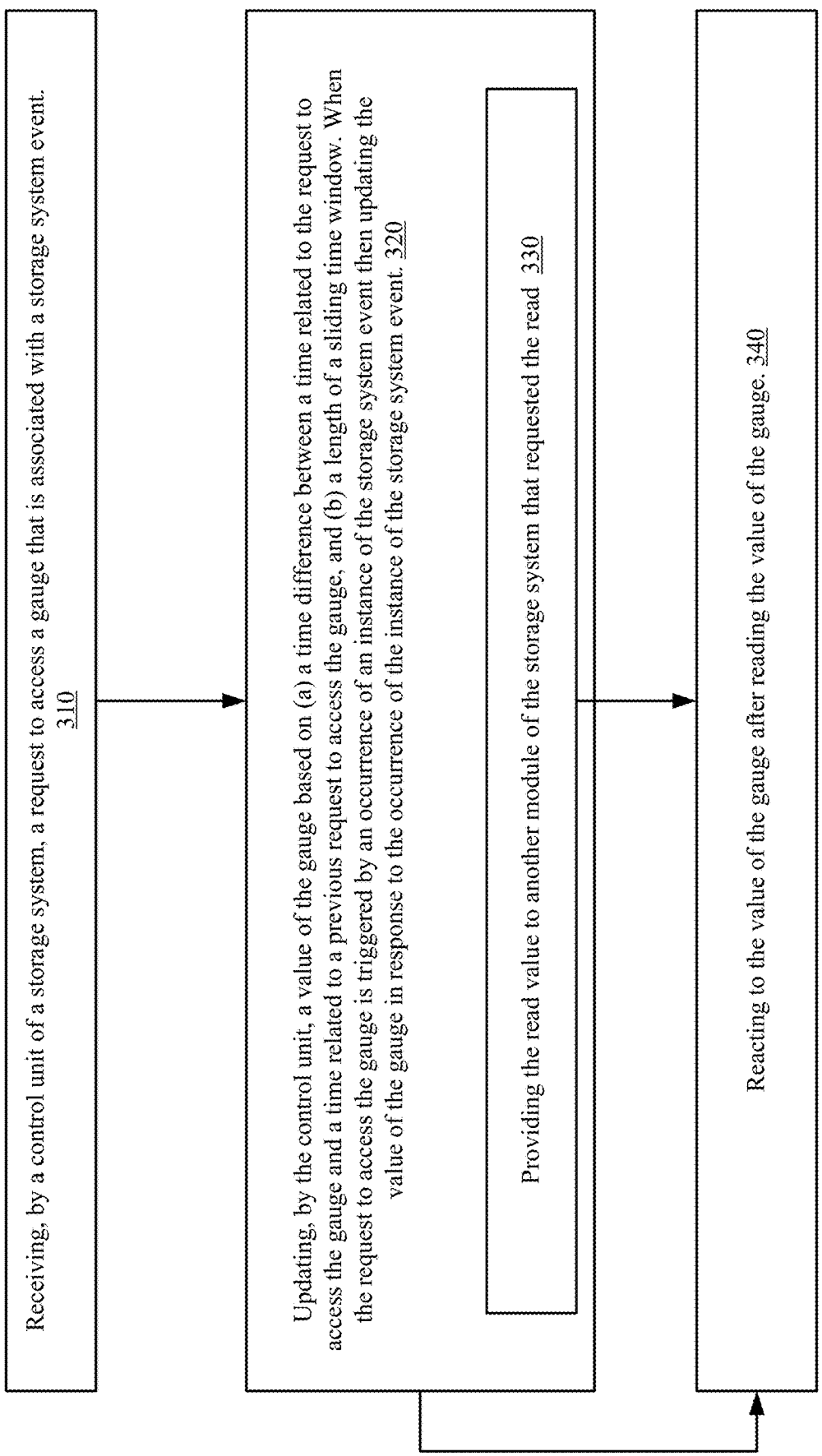
FIG. 9 illustrates an example of a method.

FIG. 9 illustrates method 300.

Method 300 is a method for monitoring a storage system event—especially monitoring multiple instances of the storage system event. A storage system event may be, for example, reception of I/O requests addressed to a certain storage entity (and/or received from a certain accessing entity), and an instance of the storage system event may be receiving a single I/O request addressed to the certain storage entity (and/or received from the certain accessing entity). More generally, the storage event may refer to a certain type of occurrences and the instance of the storage system event may be a single occurrence of that type.

Method 300 may start by step 310 of receiving, by a control unit of a storage system, a request to access a gauge that is associated with a storage system event. The request to access may be a read request for reading the value of the gauge or a request that is triggered upon an occurrence of an instance of the storage system event.

The control unit may be included in a storage controller, may be allocated per storage system event, may be allocated per storage system, may be allocated per a logical and/or physical memory space (e.g., per volume, per storage device), and the like.

Step 310 may be followed by step 320 of updating, by the control unit, a value of the gauge based on (a) a time difference between a time related to the request to access the gauge (the current request) and a time related to a previous request to access the gauge, and (b) a length of a sliding time window. The time related to the request to access may be, for example, the time the request was received, the time the request was issued, or any formula that depends on a receiving time or issuing time to reflect delays, etc. The time related to the previous request to access, may be the time the previous request was received, the time the previous request was issued, or any formula that depends on a receiving time or issuing time to reflect delays, etc.

When the request to access the gauge is triggered by an occurrence of an instance of the storage system event then step 320 also includes updating the value of the gauge in response to the occurrence of the instance of the storage system event.

The value of the gauge provides an approximation of an average rate of instances of the storage system event during the sliding time window.

When the request to access the gauge is a read request then step 320 may include step 330 of providing the read value to another module of the storage system that requested the read.

Referring to step 320—the pervious request to access the gauge and the request to access the gauge may be consecutive requests to access the gauge. Thus—the previous request is the last request before the request of step 310. The previous request may be related only to requests triggered by an occurrence of the storage system event or to any type of request (both read request and request that is triggered by an occurrence of the storage system event).

Step 320 may include at least one of the following:

a. Updating the value of the gauge to reduce the approximation of the average rate using an exponential value that reflects the time difference and the length of the sliding time window. A lengthier time difference results a greater reduction than a shorter time difference. The reduction is exponential in time.

b. Updating the value of the gauge to reduce the approximation of the average rate using an exponential value that reflects a ratio between the time difference and the length of the sliding time window.

c. Multiplying the value of the gauge by an exponential value that has a base and an exponent, wherein the base equals e and the exponent equals −DeltaT/W, wherein DeltaT is the time difference and W is the length of the sliding time window.

d. When the accessing of the gauge is triggered by the occurrence of the instance of the storage system event then—updating the value of the gauge to increase the approximation of the average rate based on the length of the sliding time window.

e. When the accessing of the gauge is triggered by the occurrence of the instance of the storage system event then—increasing the value of the gauge by 1/W.

f. When multiple instances of the storage system event occur concurrently (at the exact same time—or at a time difference that is finer than the resolution of the updating process—then the value of the gauge is updated based on the number of the multiple instances and may be further based on the length of the sliding time window.

Step 330 may be followed by step 340 of reacting to the value of the gauge.

The reacting may include, for example, enforcing a service level agreement that is related to the storage system event.

The reacting may include restricting an access to a storage system entity related to the storage system event that if completed would violate a service level agreement that is related to the storage system entity. The restricting may include: denying access of violating requests, delaying responses, checking the status of system resources and act accordingly (e.g., replying to violating requests only if the system resources allow it).

The reacting may include re-adjusting or reconfiguring system parameters, or changing allocation of system resources, or changing work balance among system resources, or changing caching rules or policies, or performing any memory management operation or any other response.

While steps 310-340 referred to the monitoring of a single storage system event (multiple instances)—method 300 may be applied for monitoring different storage system events—by using different gauges.

Accordingly—method 300 may include allocating different gauges to different types of storage system events; and executing, for each gauge, the steps of: (i) receiving, by the control unit of the storage system, a request to access the gauge; (ii) updating, by the control unit, a value of the gauge in response to the request to access; wherein the updating comprises updating the value of the gauge based on (a) a time difference between a time related to the request to access the gauge and a time related to a previous request to access the gauge, and (b) a length of a sliding time window; wherein when the request to access the gauge is triggered by an occurrence of an instance of a storage system event of a type that is associated with the gauge then the updating is further responsive to the occurrence of the instance of the storage system event. The value of the gauge provides an approximation of an average rate of instances of storage system event of the type that is associated with the gauge per the sliding time window. (iii) When the request to access the gauge is a read request then reading the value of the gauge after the updating of the value of the gauge. The different event types may be associated with different entities related to the storage system. For example, a certain event type may be related to accesses towards a certain volume, and the different event types are associated with accesses to the different volumes of the storage system. Alternatively or additionally, the different event types may be associated with requests from different host computers, and/or associated with different SLAs, and/or status or load on different storage resources (storage devices, memory partitions, communication channels, etc.) and any other conditions in the storage system.

When values of more than a single gauge is updated the method may include reacting to the values (and not just to a single value). Method 300 may, for example, include performing memory management operations based on values of two or more of the different gauges. For example—prioritizing one storage system event over the other, reassigning system resources by reducing resources allocated to one storage system event and increasing the resources of a second storage system event, limiting the execution of one or more storage system events, limiting parameters (such as an amount of data transferred) related to one or more instances of a storage system event, and the like.

Figure 10:
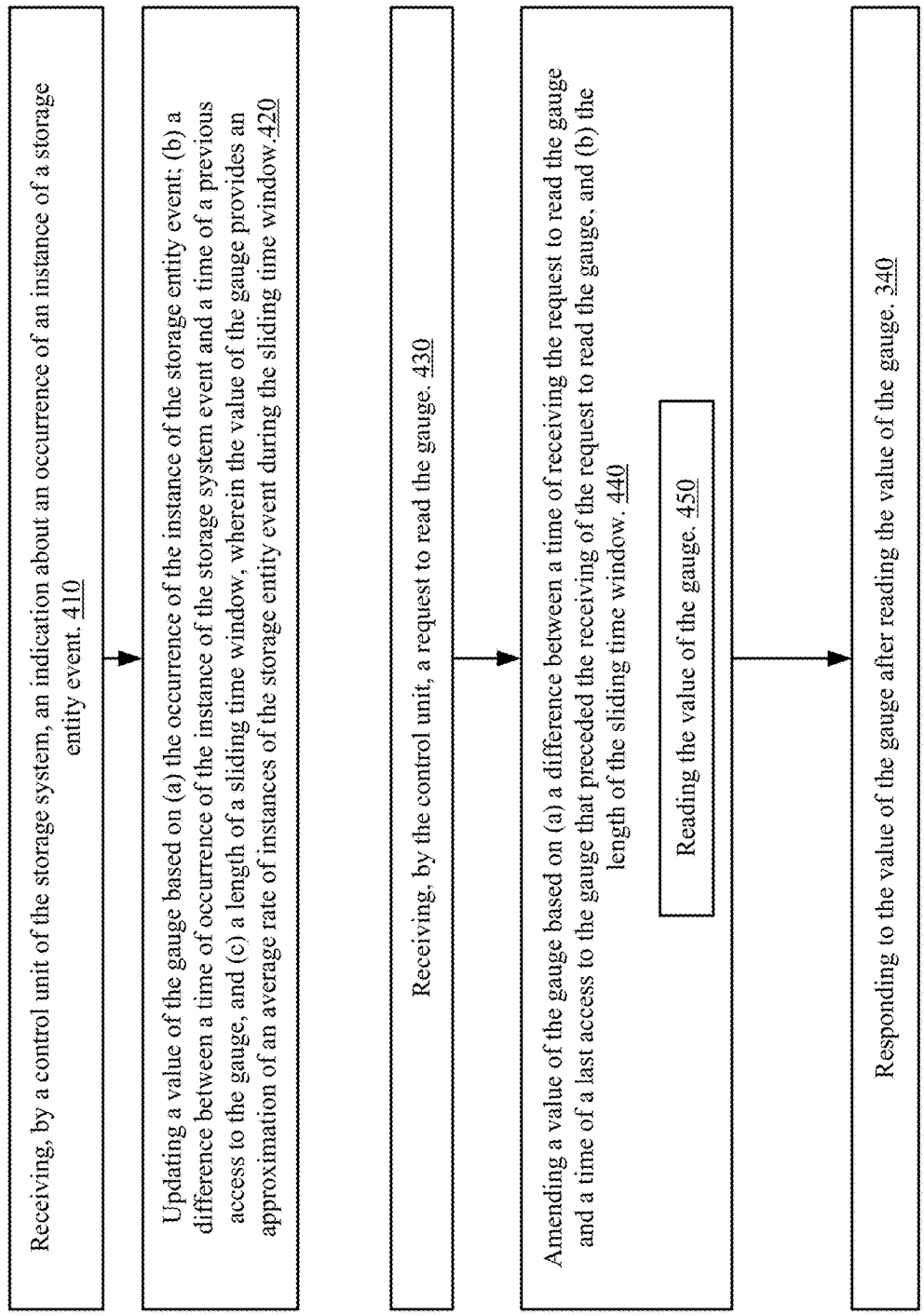
FIG. 10 illustrates an example of a method.

FIG. 10 illustrates method 400.

Method 400 is for monitoring storage system events.

Method 400 may start by step 410 of receiving, by a control unit of the storage system, an indication about an occurrence of an instance of a storage entity event.

Step 420 may be followed by step 420 of updating a value of the gauge based on (a) the occurrence of the instance of the storage entity event; (b) a difference between a time of occurrence of the instance of the storage system event and a time of a previous access to the gauge, and (c) a length of a sliding time window, wherein the value of the gauge provides an approximation of an average rate of instances of the storage entity event during the sliding time window.

Method 400 may also include step 430 of receiving, by the control unit, a request to read the gauge.

Step 430 may be followed by step 440 of amending a value of the gauge based on (a) a difference between a time of receiving the request to read the gauge and a time of a last access to the gauge that preceded the receiving of the request to read the gauge, and (b) the length of the sliding time window.

Step 440 may include step 450 of reading the value of the gauge.

Step 450 or 420 may be followed by step 340 of reacting to the value of the gauge.

Method 400 (as well as method 300) may include limiting the information about the occurrence of instances of the storage entity event to the gauge.

For example—assuming that the sliding time window has multiple segments (e.g., time slots). Instead of maintaining counters for each one of the segments—only the gauge is maintained.

FIG. 11 illustrates method 500.

Method 500 is a method for monitoring a parameter related to a storage system event.

Method 500 may include step 510 of receiving, by a control unit of a storage system, a request to access a gauge that is associated with a storage system event.

Step 510 may be followed by step 520 of updating, by the control unit, a value of the gauge based on (a) a time difference between a time related to the request to access the gauge and a time related to a previous request to access the gauge, and (b) a length of a sliding time window.

When the request to access the gauge is triggered by an occurrence of an instance of a storage system event then step 520 also include updating the value of the gauge in response to a value of the parameter that is related to the occurrence of the instance of the storage system event.

The value of the gauge provides an approximation of an average value of the parameter of instances of the storage system event during the sliding time window.

When the request to access the gauge is a read request then—step 520 may be followed by reading the value of the gauge (530)—and even by reacting to the value of the gauge (540).

The parameter may be an amount of data transferred during the instance of the storage system event (e.g., an I/O request towards a certain volume) or the number of instances of the event (e.g., the number of concurrently received I/O requests) or any other parameter.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory, and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

more, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for monitoring a storage system event, the method comprises:
receiving, by a control unit of a storage system, a request to access a gauge that is associated with the storage system event;
updating, by the control unit, a value of the gauge based on (a) a time difference between a time related to the request to access the gauge and a time related to a previous request to access the gauge, and (b) a length of a sliding time window;

wherein the value of the gauge provides an approximation of an average rate of instances of the storage system event during the sliding time window; and wherein when the request to access the gauge is triggered by an occurrence of an instance of the storage system event then the updating further includes updating the value of the gauge to increase the approximation of the average rate of instances of the storage system event, so as to reflect the occurrence of the instance of the storage system event.

2. The method according to claim 1 wherein when the request to access the gauge is a read request then reading the value of the gauge after the updating of the value of the gauge.

3. The method according to claim 1 wherein the previous request to access the gauge and the request to access the gauge are consecutive requests to access the gauge.

4. The method according to claim 1, comprising updating the value of the gauge to reduce the approximation of the average rate using an exponential value that reflects the time difference and the length of the sliding time window.

5. The method according to claim 1, comprising updating the value of the gauge to reduce the approximation of the average rate using an exponential value that reflects a ratio between the time difference and the length of the sliding time window.

6. The method according to claim 1, wherein the updating of the value of the gauge comprises:
multiplying the value of the gauge by an exponential value that has a base and an exponent, wherein the base equals e and the exponent equals −DeltaT/W, wherein DeltaT is the time difference and W is the length of the sliding time window.

7. The method according to claim 1, wherein when the accessing of the gauge is triggered by the occurrence of the instance of the storage system event then the updating of the value of the gauge to increase the approximation of the average rate is based on the length of the sliding time window.

8. The method according to claim 1, wherein when the accessing of the gauge is triggered by the occurrence of the instance of the storage system event then the method comprises increasing the value of the gauge by 1/W, wherein W is the length of the sliding time window.

9. The method according to claim 1, wherein when the request to access the gauge is a read request then the method comprises reacting to the value of the gauge.

10. The method according to claim 1, comprising reacting to the value of the gauge by enforcing a service level agreement that is related to the storage system event.

11. The method according to claim 1, comprising reacting to the value of the gauge by restricting an access to a storage system entity related to the storage system event that when completed will violate a service level agreement that is related to the storage system entity.

12. The method according to claim 1, wherein when the request to access the gauge is triggered by occurrences of multiple instances of the storage system event then the updating further includes updating the value of the gauge to increase the approximation of the average rate of instances of the storage system event, so as to reflect the occurrences of the multiple instances of the storage system events.

13. The method according to claim 1, comprising monitoring storage system events of different types;

wherein the method comprises allocating different gauges to different types of storage system events;

wherein the method comprises executing, for each gauge, the steps of:

receiving, by the control unit of the storage system, a request to access the gauge;

updating, by the control unit, a value of the gauge in response to the request to access;

wherein the updating comprises updating the value of the gauge based on (a) a time difference between a time related to the request to access the gauge and a time related to a previous request to access the gauge, and (b) a length of a sliding time window;

wherein the value of the gauge provides an approximation of an average rate of instances of storage system event of the type that is associated with the gauge per the sliding time window; and wherein when the request to access the gauge is triggered by an occurrence of an instance of a storage system event of a type that is associated with the gauge then the updating further includes updating the value of the gauge to increase the approximation of the average rate of instances of the storage system event, so as to reflect the occurrence of the instance of the storage system event of the type that is associated with the gauge;

and wherein the request to access the gauge is a read request then reading the value of the gauge after the updating of the value of the gauge.

14. The method according to claim 13, the method comprises performing memory management operations based on values of the different gauges.

15. A non-transitory computer program product that stores instructions that once executed by a control unit of a storage system, cause the storage controller to execute the steps of: receiving a request to access a gauge that is associated with a storage system event; updating a value of the gauge based on (a) a time difference between a time related to the request to access the gauge and a time related to a previous request to access the gauge, and (b) a length of a sliding time window; wherein the value of the gauge provides an approximation of an average rate of instances of the storage system event during the sliding time window; and wherein when the request to access the gauge is triggered by an occurrence of an instance of the storage system event then the updating further includes updating the value of the gauge to increase the approximation of the average rate of instances of the storage system event, so as to reflect the occurrence of the instance of the storage system event.

16. A storage system comprising a control unit that is configured to receive a request to access a gauge that is associated with a storage system event; update, by the control unit, a value of the gauge based on (a) a time difference between a time related to the request to access the gauge and a time related to a previous request to access the gauge, and (b) a length of a sliding time window; wherein the value of the gauge provides an approximation of an average rate of instances of the storage system event during the sliding time window; and wherein when the request to access the gauge is triggered by an occurrence of an instance of the storage system event then the updating further includes updating the value of the gauge to increase the approximation of the average rate of instances of the storage system event, so as to reflect the occurrence of the instance of the storage system event.

* * * * *